United States Patent
Suzuki et al.

(10) Patent No.: US 7,434,103 B2
(45) Date of Patent: Oct. 7, 2008

(54) PROGRAM PROCESSING DEVICE

(75) Inventors: Takayuki Suzuki, Gifu (JP); Naoya Yamakawa, Gifu-ken (JP)

(73) Assignee: Sanyo Electric Co., Ltd., Osaka (JP)

(*) Notice: Subject to any disclaimer, the term of this patent is extended or adjusted under 35 U.S.C. 154(b) by 531 days.

(21) Appl. No.: 10/919,147

(22) Filed: Aug. 16, 2004

(65) Prior Publication Data
US 2005/0044452 A1  Feb. 24, 2005

(30) Foreign Application Priority Data
Aug. 21, 2003  (JP) .............................. 2003-297456

(51) Int. Cl.
*G06F 11/00* (2006.01)
(52) U.S. Cl. ....................................................... 714/38
(58) Field of Classification Search ...................... None
See application file for complete search history.

(56) References Cited

U.S. PATENT DOCUMENTS

| | | | |
|---|---|---|---|
| 5,530,804 A | | 6/1996 | Edgington et al. |
| 5,668,815 A | * | 9/1997 | Gittinger et al. ............. 714/719 |
| 5,860,161 A | * | 1/1999 | Hansen ....................... 711/211 |
| 5,862,148 A | * | 1/1999 | Typaldos et al. ............. 714/724 |
| 5,903,912 A | * | 5/1999 | Hansen ....................... 711/154 |
| 5,943,498 A | | 8/1999 | Yano et al. |
| 6,041,406 A | * | 3/2000 | Mann .......................... 712/227 |
| 6,094,729 A | * | 7/2000 | Mann ............................ 714/25 |
| 6,158,023 A | | 12/2000 | Ubukata et al. |
| 6,185,731 B1 | * | 2/2001 | Maeda et al. ................ 717/128 |
| 6,256,777 B1 | | 7/2001 | Ackerman |
| 6,331,957 B1 | | 12/2001 | Kurts et al. |
| 6,643,803 B1 | | 11/2003 | Swoboda et al. |
| 6,668,339 B1 | | 12/2003 | Maeda |
| 6,687,857 B1 | | 2/2004 | Iwata et al. |
| 6,751,751 B1 | | 6/2004 | Murray et al. |
| 6,820,192 B2 | * | 11/2004 | Cho et al. .................... 712/227 |
| 6,918,058 B2 | * | 7/2005 | Miura et al. ................... 714/30 |
| 6,934,886 B2 | * | 8/2005 | Ok ................................ 714/34 |
| 6,985,980 B1 | | 1/2006 | Allegrucci |
| 7,114,101 B2 | | 9/2006 | Kudo et al. |
| 2001/0010083 A1 | | 7/2001 | Satoh |
| 2002/0065646 A1 | | 5/2002 | Waldie et al. |
| 2002/0087918 A1 | * | 7/2002 | Miura et al. .................. 714/38 |
| 2002/0091494 A1 | | 7/2002 | Kudo |
| 2002/0144235 A1 | | 10/2002 | Simmers et al. |
| 2002/0157085 A1 | | 10/2002 | Yabuno et al. |

FOREIGN PATENT DOCUMENTS

| | | |
|---|---|---|
| JP | 08-185339 | 7/1996 |
| JP | 11-282712 | 10/1999 |
| JP | 2003-162426 | 6/2003 |

* cited by examiner

*Primary Examiner*—Nadeem Iqbal
(74) *Attorney, Agent, or Firm*—Fish & Richardson P.C.

(57) ABSTRACT

A program processing device that improves efficiency when debugging software. The processing device includes a CPU core and a monitor circuit, which is connected to an internal bus that is used by the CPU core to access a memory area. The monitor circuit monitors the internal bus and checks whether a designated variable in the program has been rewritten. When the designated variable has been rewritten, the monitor circuit stores the updated data and transmits variable information stored in an internal register to a debugging tool in a predetermined transmission cycle.

10 Claims, 2 Drawing Sheets

PROGRAM PROCESSING DEVICE

CROSS-REFERENCE TO RELATED APPLICATIONS

This application is based upon and claims priority from Japanese Patent Application No. 2003-297456 filed on Aug. 21, 2003, which is herein incorporated in its entirety by reference.

BACKGROUND OF THE INVENTION

The present invention relates to a program processing device, and more particularly, to a control LSI optimal for use when testing the operation of built-in software (firmware).

In recent years, an evaluation chip is normally used when developing software. The evaluation chip includes a CPU of a target system and an interface circuit, which supports software debugging. The evaluation chip, which is mounted on a user board, is connected to an in-circuit emulator (ICE (a registered trademark)). The ICE provides a debug command to the CPU to perform software debugging. Japanese Laid-Open Patent Publication No. 11-282712 describes an example of a debug system that uses an evaluation chip.

In a semiconductor package device, such as a system on a chip (SOC) that lays out a plurality of peripheral circuits including a CPU to realize system level functioning, the bus for the CPU and control signals are concentrated in the chip. This structure decreases the debugging efficiency. More specifically, when developing software for the SOC, CPUs must separately be connected to an evaluation board to undergo debugging. Thereafter, the CPUs and a plurality of peripheral circuits are ultimately integrated in a single chip. This increases the developing cost, prolongs the designing time, and lengthens the turn around time (TAT).

Generally, the number of terminal pins that are used for debugging in an SOC is small to minimize the cost for conducting testing, such as software debugging. Thus, debugging cannot be performed efficiently.

When developing software in the prior art, a breakpoint is set in the source code for a program. The execution of the program is interrupted when reaching the breakpoint to perform debugging. However, the program memory must be rewritten to set the breakpoint. This makes debugging complicated.

SUMMARY OF THE INVENTION

One aspect of the present invention is a program processing device for processing a program including at least one variable. The program processing device includes a semiconductor substrate. A processor, arranged on the semiconductor substrate, executes the program and accesses the memory area. An internal bus is arranged on the semiconductor substrate and connected to the processor. The processor accesses the memory area via the internal bus. A monitor circuit, which is connected to the internal bus, monitors the at least one variable.

A further aspect of the present invention is a program processing device for accessing a memory area and processing a program including at least one variable. The program processing device includes a semiconductor substrate. A processor, arranged on the semiconductor substrate, accesses a memory area to execute the program. An internal bus is arranged on the semiconductor substrate and connected to the processor. The processor accesses a memory area via the internal bus to execute the program. A monitor circuit, which is connected to the internal bus, monitors the at least one variable. When the processor rewrites the value of the at least one variable, the monitor circuit stores the updated data.

Another aspect of the present invention is a debugging system for debugging a program including a variable designated by a programmer, including a debugging device. A program processing device, connected to the debugging device in a communicable manner, processes the program. The program processing device includes a semiconductor substrate. A processor, arranged on the semiconductor substrate, executes the program. An internal bus is arranged on the semiconductor substrate and connected to the processor. A monitor circuit monitors the internal bus during execution of the program and checks whether the variable has been rewritten. When the variable is rewritten, the monitor circuit stores the updated data and periodically transmits variable information to the debugging device in a predetermined transmission cycle.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A program processing device according to a preferred embodiment of the present invention will now be discussed. The program processing device is applied to a control LSI for debugging firmware.

Figure 1:
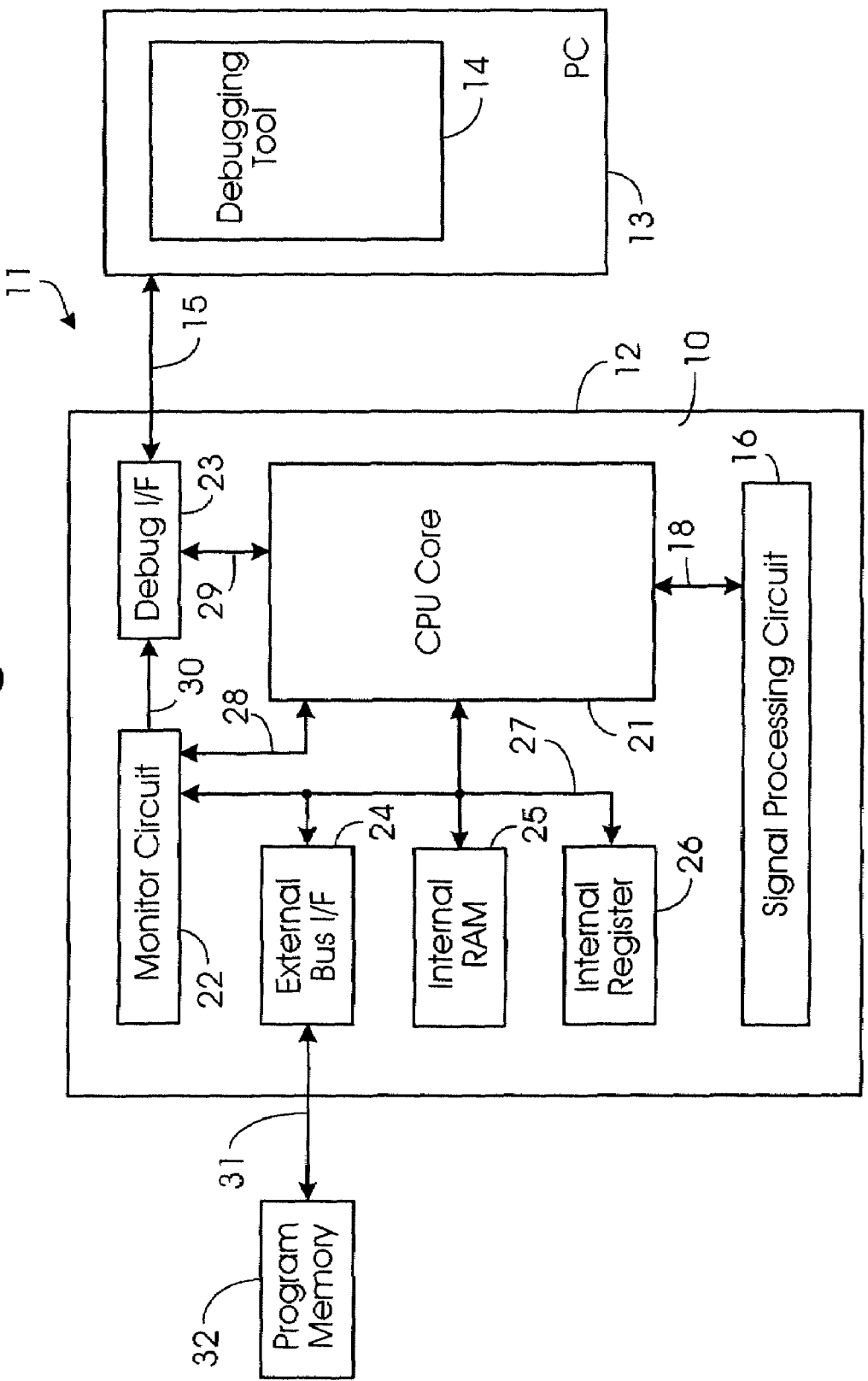
FIG. 1 is a schematic block diagram of a debug system according to a preferred embodiment of the present invention.

Referring to FIG. 1, in the preferred embodiment, a debug system 11 includes a control LSI 12, which functions as a program processing device, and a personal computer (PC) 13, which is connected to the control LSI 12 and functions as a debugging device. The LSI 12 is a system LSI configured by mounting a CPU and a plurality of peripheral circuits on a single chip. Further, the LSI 12 realizes the system level functions. The PC 13 includes a debugging tool, such as an ICE.

The control LSI 12 includes a debug terminal (not shown). A bus cable 15 of a tool bus is connected to the debug terminal. The control LSI 12 performs serial communication with the debugging tool 14 via the bus cable 15. It is preferred that the number of pins for the debug terminal be small to keep the control LSI 12 compact. In the preferred embodiment, there are two debug terminal pins, which are connected to a clock bus and a data bus. Data transfer (bidirectional) is performed between the control LSI 12 and the debugging tool 14 in synchronism with a clock signal.

The control LSI 12 includes a semiconductor substrate 10. A CPU core 21, a monitor circuit 22, a debug interface (I/F) 23, an external bus interface (I/F) 24, an internal RAM 25, and an internal register 26 are mounted on the semiconductor substrate 10. The internal RAM 25 and the internal register 26 function as peripheral circuits. The control LSI 12 includes a signal processing circuit 16 controlled by the CPU core 21.

The CPU core 21, the monitor circuit 22, the external bus I/F 24, the internal RAM 25, and the internal register 26 are connected to one another by an internal bus 27. The CPU core 21 and the monitor circuit 22 are connected to each other by an internal bus 28. The CPU core 21 and the debug I/F are connected to each other by an internal bus 29. The monitor circuit 22 and the debug I/F 23 are connected to each other by an internal bus 30. The signal processing circuit 16 and the CPU core 21 are connected to each other via an internal bus 18.

The external bus I/F 24 is connected to a program memory 32 by an external bus 31. The program memory 32 is, for example, a flash memory. Firmware, which is the subject of debugging, is stored in the CPU core 21 so that it can be executed by the CPU core 21. The program memory 32 may store command lines in machine language that can be executed by the CPU core 21. A compile process or a link process is performed on the firmware (program), which is written in high-level language such as C-language, to convert the firmware to the machine language command lines.

The CPU core 21 reads the command lines from the program memory 32 and decodes the command lines. The CPU core 21 accesses a section (memory area) designated by an address mapped on a memory map of the CPU core 21 to execute various processes in accordance with the decoding result. The memory area includes the internal RAM 25 and the internal register 26, which are connected to the CPU core 21 by the internal bus 27, and the memory area peripheral circuits (not shown) connected to the control LSI 12 by the external bus 31. The internal bus 27 is used when the CPU core 21 accesses the memory area.

When the CPU core 21 executes a program, the monitor circuit 22 monitors an internal bus 27 to monitor the state of one or more variables set in the source code for the program. The monitor circuit 22 will now be described with reference to FIG. 2. The monitor circuit 22 includes an internal register 41. Address values of variables to be monitored by the monitor circuit 22 are registered in the internal register 41. When the CPU core 21 executes a program, the monitor circuit 22 monitors the internal bus 27 (specifically, address bus) and checks whether an address registered in the internal register 41 has been transmitted through the internal bus 27. Thus, the monitor circuit 22 recognizes whether the CPU core 21 is accessing the variable, which is associated with the address. When the variable is rewritten by the CPU core 21, the monitor circuit 22 retrieves the updated data from the internal bus 27 (specifically, data bus) and stores the updated data in the internal register 41. In this manner, during the execution of the program, the monitor circuit 22 monitors variables of the program that are designated beforehand to check whether the variables have been rewritten.

The internal register 41 will now be discussed with reference to FIG. 2. The internal register 41 includes an address register 42 and a data register 43, which hold, for example, twelve types of variable information. "Variable information" refers to the address values of the monitored variables, and the values of the variables monitored in accordance with the address values.

The monitor circuit 22 monitors the state of the twelve variables. Each piece of variable information is held in the address register 42 and the data register 43 in relation with monitor data MON0 to MON11.

The address register 42 includes a first register ADRH, a second register ADRM, and a third register ADRL, each of which stores eight bits of data, to store the address value of a variable monitored in a program (total twenty-four bits).

Based on the address values (each twenty-four bits) registered in the address register 42, the data register 43 stores the eight bits of a monitored variable value (designated value) as DATA.

For monitor data MON0 to MON11, the monitor circuit 22 monitors the variable designated by the address register 42. When a designated variable is rewritten by the CPU core 21, the address register 42 stores the updated variable in the data register 43.

Figure 2:
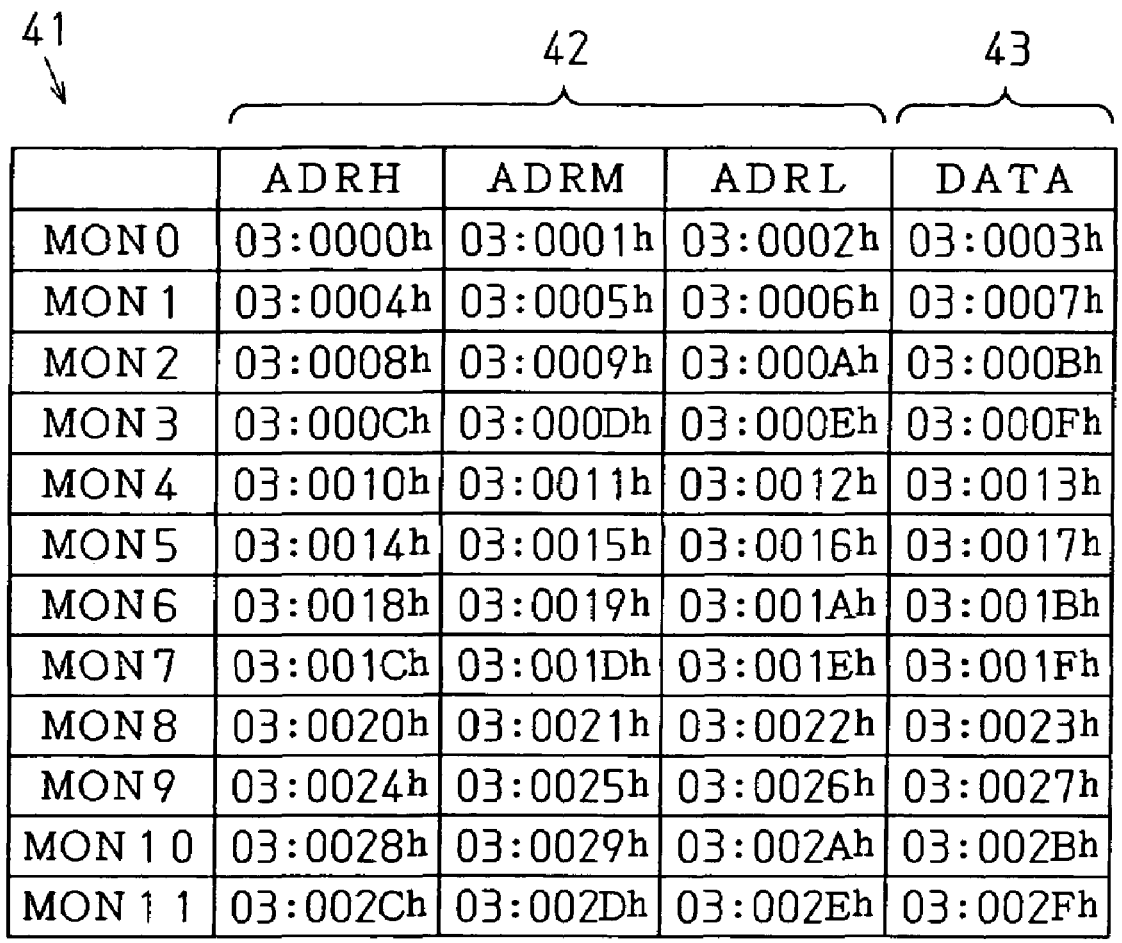
FIG. 2 is a diagram showing an example of an internal register in a monitor circuit.

For example, the monitor circuit 22 monitors the variable of the monitor data MON0 designated by "03:0000h", "03:0001h", "03:0002h" of the first, second, and third registers ADRH, ADRM, and ADRL shown in FIG. 2. When the variable is rewritten, the monitor circuit 22 stores the updated variable value in "03:0003h" of the data register 43.

Following a predetermined transmission command, the variable information stored in the internal register 41 (address register 42 and data register 43) is periodically transmitted from the monitor circuit 22 to the debugging tool 14 (PC 13) via the debug I/F 23. In the preferred embodiment, serial data is transmitted by the bus cable 15, which is applicable for two pins.

For example, as variable information following the transmission command "C0h" and "04h" (not shown), the monitor circuit 22 transmits the address value of the variable stored in the first, second, and third registers ADRH, ADRM, and ADRL corresponding to the monitor data MON0, that is, "03:000h", "03:0001h", and "03:0002h". Based on the address value, the monitor circuit 22 transmits the data stored in "03:0003h" as the monitored variable based on the address value. The monitor circuit 22 transmits variable information to the debugging tool 14 in the order of monitor data MON0, MON1, . . . , MON11, and MON0 at a predetermined transmission cycle that is in accordance with the clock frequency of the CPU core 21.

The debugging tool 14 sets the address values in the internal register 41. The debugging tool 14 transmits the address of the variable monitored by the monitor circuit 22 to the control LSI 12 in accordance with an instruction input to an input device (not shown) of the PC 13 by a developer (user). More specifically, the debugging tool 14 obtains an address value of a variable, which is mapped, in the program from a memory map of the CPU core 21. Then, the debugging tool 14 transfers that address to the control LSI 12 from the PC 13 via the bus cable 15. The CPU core 21 receives the transferred address (address value of the variable) from the debug I/F 23 via the internal bus 29. Then, the CPU core 21 sets the received address in the monitor circuit 22 (internal register 41) through the internal bus 28.

Subsequently, the debugging tool 14 has the CPU core 21 execute the program (firmware). During the execution of the program, the monitor circuit 22 constantly monitors whether data (variable value) corresponding to a predetermined address value has been rewritten. When the data is rewritten, the monitor circuit 22 stores the updated variable value in the internal register 41. Then, the monitor circuit 22 transmits the variable information stored in the internal register 41 from the debug I/F 23 to the debugging tool 14 (PC 13) via the internal bus 30 together with the predetermined transmission command. The debugging tool 14 sequentially retrieves the variable information transmitted from the control LSI 12 and then outputs the contents of the information to a display (not shown) of the PC 13. Accordingly, the user may check the operation state of the program from the variable information and debug the firmware.

The preferred embodiment has the advantages described below.

(1) The control LSI 12 includes the monitor circuit 22, which monitors the internal bus 27 when the CPU core 21 accesses the memory area and monitors the state of designated variables. When a monitored variable is rewritten to an arbitrary value, the monitor circuit 22 stores the updated data (variable value) and periodically transmits the variable information held in the internal register 41 to the debugging tool 14. Thus, the variable designated in the program (e.g., variable located at a location where branching occurs) by a user may be checked to perform debugging. Further, the state of variables (program operation state) may be monitored in real time without stopping the operation of the CPU core 21. This improves the debugging efficiency.

(2) Debugging is performed on a plurality of variables that are designated beforehand based on the variable information sequentially transmitted in a serial manner from the monitor circuit 22. Further, debugging is performed using the cable 15 that includes two buses, the clock bus and the data bus. Since the number of debug terminals is reduced, the control LSI 12 does not have to be enlarged.

(3) A breakpoint used for debugging does not have to be provided in the program source code as in the prior art. Thus, the program memory does not have to be rewritten to set the breakpoint. However, it may be possible to set a breakpoint in the source code of a program in order to acquire variable information.

(4) When developing software for a microcomputer or the like, software debugging may be performed in a state in which the CPU (CPU core 21) is connected to the microcomputer. This improves the software development efficiency and reduces the development cost. As a result, designing time is reduced and the TAT is shortened.

It should be apparent to those skilled in the art that the present invention may be embodied in many other specific forms without departing from the spirit or scope of the invention. Particularly, it should be understood that the present invention may be embodied in the following forms.

The control LSI 12 (system LSI) includes the internal RAM 25 and the internal register 26 (FIG. 1). However, the peripheral circuits mounted on the chip in addition to the CPU core 21 are not limited to the internal RAM 25 and the internal register 26.

The configurations of the monitor circuit 22 and the internal register 41 does not have to be as shown in FIG. 2. The number of pieces of variable information held as monitor data is not limited to twelve as in the preferred embodiment as long as at least one piece of information is held.

The variable information held in the internal register 41 does not have to be periodically transmitted in the same manner as in the preferred embodiment. The variable information may be transmitted in accordance with a predetermined rule, such as whenever the variable information is updated.

The present invention may be applied when debugging anything other than firmware.

The present examples and embodiments are to be considered as illustrative and not restrictive, and the invention is not to be limited to the details given herein, but may be modified within the scope and equivalence of the appended claims.

What is claimed is:

1. A program processing device for processing a program including at least one variable, the program processing device comprising:
   a semiconductor substrate;
   a processor for executing the program;
   a signal processing circuit controlled by the processor;
   an internal bus on the semiconductor substrate and electrically connected to the processor, the processor being configured to access a memory area via the internal bus in order to execute the program; and
   a monitor circuit, electrically connected to the internal bus, for monitoring the at least one variable;
   wherein the processor, the signal processing circuit, the internal bus, and the monitor circuit are on the semiconductor substrate.

2. The program processing device according to claim 1, wherein the monitor circuit comprises:
   an address register for holding an address value associated with the at least one variable; and
   a data register for holding a value of the at least one variable in accordance with the address value of the at least one variable.

3. A program processing device for processing a program including at least one variable, the program processing device comprising:
   a semiconductor substrate;
   a processor for executing the program;
   a signal processing circuit controlled by the processor;
   an internal bus electrically connected to the processor, the processor being configured to access a memory area via the internal bus to execute the program; and
   a monitor circuit, electrically connected to the internal bus, for monitoring the at least one variable, wherein when the processor is configured to rewrite a value of the at least one variable to produce updated data, and wherein the monitor circuit stores the updated data;
   wherein the processor, the signal processing circuit, the internal bus, and the monitor circuit are on the semiconductor substrate.

4. The program processing device according to claim 3, wherein the monitor circuit comprises:
   an address register for holding an address value associated with the at least one variable; and
   a data register for holding the value of the at least one variable based on the address value of the at least one variable.

5. The program processing device according to claim 4, wherein the program processing device is for use with a debugging device; and
   wherein the program processing device further comprises:
      an interface circuit for connecting the monitor circuit to the debugging device, wherein the monitor circuit is configured to transmit, to the debugging device, variable information following a predetermined transmission command, the variable information comprising the address value and the at least one variable associated with the address value.

6. The program processing device according to claim 5, wherein the monitor circuit is configured to periodically transmit the variable information to the debugging device.

7. The program processing device according to claim 6, wherein the monitor circuit is configured to transmit the variable information serially to the debugging device.

8. A debugging system for debugging a program including a variable designated by a programmer, the debugging system comprising:
   a debugging device;
   a program processing device, in communication with the debugging devices, for processing the program, the program processing device comprising:
      a semiconductor substrate;

a processor for accessing a memory area to execute the program;

an internal bus on the semiconductor substrate and electrically connected to the processor; and a monitor circuit for monitoring the internal bus during execution of the program and for checking whether the variable has been rewritten to produce updated data, wherein when the variable has been rewritten, the monitor circuit is configured to store the updated data and to periodically transmit information regarding the variable to the debugging device in a predetermined transmission cycle.

9. The debugging system according to claim 8, wherein the monitor circuit is configured to transmit the information serially to the debugging device.

10. The debugging system according to claim 8, wherein the debugging device is usable to designate the variable.

* * * * *